United States Patent
Thompson et al.

(10) Patent No.: US 10,457,393 B2
(45) Date of Patent: Oct. 29, 2019

(54) APPARATUSES AND METHODS FOR RECEIVING AERIAL VEHICLE DELIVERY

(71) Applicant: Walmart Apollo, LLC, Bentonville, AR (US)

(72) Inventors: John P. Thompson, Bentonville, AR (US); David C. Winkle, Bella Vista, AR (US); Eric A. Letson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/479,036

(22) Filed: Apr. 4, 2017

(65) Prior Publication Data
US 2017/0283057 A1  Oct. 5, 2017

Related U.S. Application Data

(60) Provisional application No. 62/318,675, filed on Apr. 5, 2016.

(51) Int. Cl.
*B64D 1/22* (2006.01)
*B64C 39/02* (2006.01)
*B64F 1/00* (2006.01)

(52) U.S. Cl.
CPC .............. *B64D 1/22* (2013.01); *B64C 39/024* (2013.01); *B64F 1/007* (2013.01); *B64C 2201/128* (2013.01); *B64C 2201/141* (2013.01)

(58) Field of Classification Search
CPC ... B64D 1/22; B64C 39/024; B64C 2201/024; B64C 2201/128; B64C 2201/146
See application file for complete search history.

(56) References Cited

U.S. PATENT DOCUMENTS

| | | | | |
|---|---|---|---|---|
| 5,344,203 A | * | 9/1994 | Tollenaere | B64D 1/22 244/137.1 |
| 8,511,606 B1 | * | 8/2013 | Lutke | B64C 39/028 244/100 R |
| 9,550,577 B1 | * | 1/2017 | Beckman | B64C 39/024 |
| 9,573,684 B2 | | 2/2017 | Kimchi | |
| 9,650,136 B1 | * | 5/2017 | Haskin | B64D 1/12 |

(Continued)

FOREIGN PATENT DOCUMENTS

| WO | 2015108588 | 7/2015 |
|---|---|---|
| WO | 2015160672 | 10/2015 |

OTHER PUBLICATIONS

Empire Unmanned Aircraft Systems Receiving; "Drone Pad", http://www.uasreceiving.com/home.html, Oct. 19, 2014, pp. 1.

(Continued)

*Primary Examiner* — Courtney D Heinle
(74) *Attorney, Agent, or Firm* — Fitch, Even, Tabin & Flannery LLP

(57) ABSTRACT

Systems, apparatuses, and methods are provided herein for receiving aerial vehicle delivery. An apparatus for receiving aerial vehicle delivery comprises a receiving pad configured to receive a package released by an aerial vehicle; one or more accessory couplers attached to the receiving pad and configured to allow a receiving pad accessory to couple to and uncouple from the receiving pad; and a wall portion surrounding at least a portion of the receiving pad, the wall portion being removably coupled to the receiving pad via an accessory coupler.

18 Claims, 6 Drawing Sheets

(56) References Cited

U.S. PATENT DOCUMENTS

| | | | |
|---|---|---|---|
| 9,969,494 B1* | 5/2018 | Buchmueller | B64D 1/08 |
| 2004/0256519 A1* | 12/2004 | Ellis | B64C 39/024 |
| | | | 244/110 E |
| 2007/0228214 A1* | 10/2007 | Horak | A63H 27/14 |
| | | | 244/63 |
| 2015/0120094 A1* | 4/2015 | Kimchi | B64C 39/024 |
| | | | 701/3 |
| 2015/0158599 A1* | 6/2015 | Sisko | B64F 1/32 |
| | | | 244/114 R |
| 2015/0175276 A1* | 6/2015 | Koster | B64F 1/32 |
| | | | 244/114 R |
| 2015/0183528 A1* | 7/2015 | Walsh | B64F 1/32 |
| | | | 701/3 |
| 2015/0259078 A1* | 9/2015 | Filipovic | H04W 88/08 |
| | | | 244/114 R |
| 2015/0277440 A1* | 10/2015 | Kimchi | G01S 17/08 |
| | | | 701/26 |
| 2015/0317596 A1* | 11/2015 | Hejazi | G06Q 50/28 |
| | | | 705/330 |
| 2015/0317597 A1* | 11/2015 | Shucker | G06Q 10/083 |
| | | | 235/375 |
| 2016/0039541 A1* | 2/2016 | Beardsley | B60L 11/1816 |
| | | | 701/2 |
| 2016/0068264 A1* | 3/2016 | Ganesh | G08G 5/0069 |
| | | | 701/2 |
| 2016/0068265 A1* | 3/2016 | Hoareau | G05D 1/102 |
| | | | 701/3 |
| 2016/0196755 A1* | 7/2016 | Navot | G05D 1/0676 |
| | | | 701/4 |
| 2016/0257401 A1* | 9/2016 | Buchmueller | B64C 39/024 |
| 2017/0110017 A1* | 4/2017 | Kimchi | G08G 5/0069 |
| 2017/0267347 A1* | 9/2017 | Rinaldi | B64D 1/22 |
| 2017/0267348 A1* | 9/2017 | Sweeny | B64C 25/58 |

OTHER PUBLICATIONS

PCT; App. No. PCT/US2017/026047; International Search Report and Written Opinion dated Jun. 16, 2017.

* cited by examiner

APPARATUSES AND METHODS FOR RECEIVING AERIAL VEHICLE DELIVERY

CROSS-REFERENCE TO RELATED APPLICATION

This application claims the benefit of the following U.S. Provisional Application No. 62/318,675 filed Apr. 5, 2016, which is incorporated herein by reference in its entirety.

TECHNICAL FIELD

This invention relates generally to aerial vehicle deliveries.

BACKGROUND

Unmanned aerial systems generally refer to aircrafts without a human pilot onboard. Initially developed for the military, UASs are increasing being used for recreational and commercial applications.

BRIEF DESCRIPTION OF THE DRAWINGS

Disclosed herein are embodiments of apparatuses and methods for receiving aerial vehicle delivery. This description includes drawings, wherein.

Figure 2:
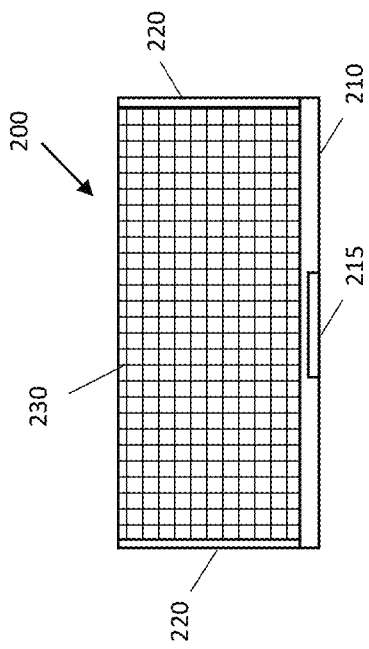
FIG. 2 is a side view of a receiving pad in accordance with several embodiments.

Elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to receiving aerial vehicle delivery. In some embodiments, an apparatus for receiving aerial vehicle delivery comprises a receiving pad configured to receive a package released by an aerial vehicle; one or more accessory couplers attached to the receiving pad and configured to allow a receiving pad accessory to couple to and uncouple from the receiving pad; and a wall portion surrounding at least a portion of the receiving pad, the wall portion being removably coupled to the receiving pad via an accessory coupler.

Aerial vehicle delivered packages may be delivered to a specific spot within a property or building designated by a customer. While a delivery location may be identified by street address or Global Positing System (GPS) coordinates, greater precision may be required to locate a designated delivery spot. In some cases, the exact delivery spot may change or not be known until the time of delivery. In some embodiments, a delivery UAV may be configured to distinguish the delivery spot from obstacles in close vertical or horizontal proximity prior to making the delivery. However, environmental factors may obscure the delivery spot from the UAV's sensors or cameras. Some packages may be dropped or released from several inches above ground and may be at risk of being blown away by propeller wash or damaged from the drop In some embodiments, an aerial delivery receiving pad is provided. The receiving pad may include one or more of anchors, suctions cups, net walls, secure enclosure, foam bottom, and hook and loop fastener (e.g. Velcro). In some embodiments, the modularity of the receiving pad provides the customer with various options based on personal preference and community requirements. In some embodiments, the receiving pad may be configured to retracted, rolled up, folded, or erected for safe storage and to prevent damage.

In some embodiments, the receiving pad may be configured to automatically retract to a vertical position when not in use. When a UVA approaches, a receiving pad holder may extend the pad to a horizontal position in response to a received signal. In some embodiments, the pad may include one or more of safety warning lights, warning audio, a digital watermark, and a homing beacon.

In some embodiments, the receiving pad may include a radio frequency beacon that stores user-configured settings such as what types of packages may be delivered to the pad and may be auto-signed/acknowledged. For example, a user may configure whether the receiving pad may accept medicine or items over a set dollar amount (e.g. $200). In some embodiments, the receiving pad may be configured to only accept "signature required" items if the receiving pad detects the presence of a user device associated with the customer in its proximity. For example, the presence of the user may be detected by determining whether the Bluetooth signal of user's smartphone is within the range of the receiving pad. In some embodiments, the beacon may be battery powered and/or be rechargeable with solar power. In some embodiments, the beacon may include a power saving mode where it may be turned on and off via the Internet of Thing (IOT). For example, the home network may automatically turn on the beacon when a delivery is expected and turn off the beacon when the delivery is received.

In some embodiments, the receiving pad may include one or more of a beacon, a homing device, a unique ID, and a digital watermark that may be attached to the customer's account at the seller and/or delivery service. A customer's account may include an address that can be converted to a latitude/longitude coordinate for the aerial vehicle.

In some embodiments, the aerial delivery receiving pad may comprise a foam based base pad. The receiving pad may further include plastic and/or cardboard sides. In some embodiments, the receiving pad may be configured to allow packages to be dropped from several inches to several feet above the ground into a cushioned receiving area with minimal damage to the package. With the use of the receiving pad, a package may be released with landing a UAV. In some embodiments, the receiving pad may include optional anchors to secure the receiving pad to the ground and/or suction cups for securing the receiving pad to a smooth surface (e.g. metal, glass). In some embodiments, the receiving pad may include net walls attached to the base of the pad to prevent propeller wash or ambient wind from blowing packages off the pad.

In some embodiments, the receiving pad may comprise digital watermarks and/or other visible patterns for a UAV to discern the receiving pad from its surrounding. In some embodiments, the specific location of the receiving pad may be identified by the UAV optically via captured images/videos. In some embodiments, the location of the receiving pad may be identified via wireless technologies such as beacons or radio frequency identification (RFID) tags. In some embodiments, different digital watermarks and/or visible patterns may be used to distinguish between the cover and the interior bottom of a secured enclosure comprising the receiving pad. In some embodiments, the UAV may be configured to determine how much of the receiving pad is currently occupied by other packages based on gaps in the visibility of the digital watermark and/or visible pattern on the pad. In some embodiments, the receiving pad may include a wireless beacon that provides identifying information of the receiving pad to a UAV such that the UAV determine whether the receiving pad is associated with the delivery order from a distance.

Figure 1:
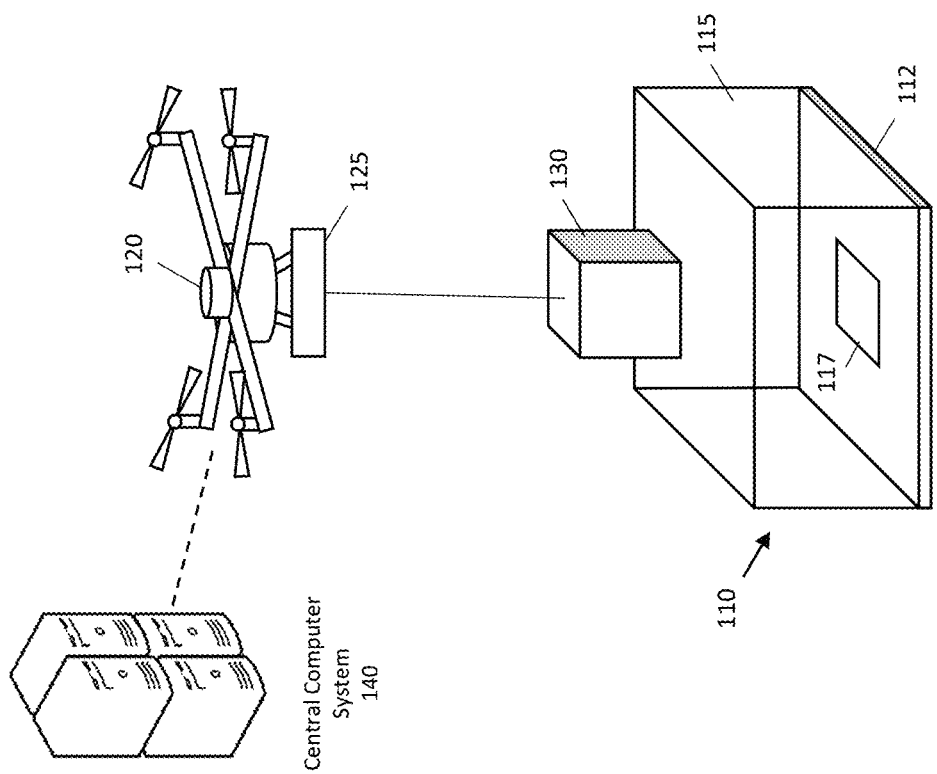
FIG. 1 is an illustration of a system in accordance with several embodiments.

Referring now to FIG. 1, a system for aerial vehicle package delivery is shown. The system includes a central computer system 140, a UAV 120 transporting a package 130, and a receiving pad 110 configured to receive the package 130.

The central computer system 140 may comprise a control circuit, a central processing unit, a processor, a microprocessor, and the like and may be one or more of a server, a central computing system, a retail computer system, a cloud-based computer system, and the like. Generally, the central computer system 140 may be any processor-based device configured to communicate with UAVs based on delivery orders. The central computer system 140 may include a processor configured to execute computer readable instructions stored on a computer readable storage memory. The central computer system 140 may generally be configured to cause the UAV 120 to travel to a delivery location, locate the receiving pad 110, and release the package 130 into the receiving pad 110. In some embodiments, the central computer system 140 may further be configured to determine whether one or more delivery conditions are met prior to instructing the release of the package 130. In some embodiments, the central computer system 140 may further provide a user interface (e.g. web page, mobile application, etc.) for users to enter and configure an aerial vehicle delivery order. For example, users may use the user interface to select items to purchase and identify a delivery location. The central computer system 140 may further associate a customer account and/or a receiving pad identifier with each delivery order assigned to a UAV 120. Generally, the central computer system 140 may perform one or more steps in the methods and processes described with reference to FIGS. 3-7 herein.

The UAV 120 may generally comprise an unmanned aerial vehicle configured to transport a package 130 from a dispatch location to a delivery location. While UAVs are generally described herein, in some embodiments, a piloted aerial vehicle may be utilized with the systems and methods described herein without departing from the spirit of the present disclosure. In some embodiments, the UAV 120 may comprise a multicopter configured to hover at the delivery location. In some embodiments, the UAV may be a quadcopter, or hexacopter, octocopter, etc. In some embodiments, the UAV 120 may comprise a communication device configured to communicate with the central computer system 140 before and/or during flight, a GPS receiver configured to provide geolocation information of the UAV 120, and a control circuit configured to control the motors driving a plurality of propellers to steer the UAV 120. In some embodiments, the UAV 120 may comprise a receiving pad sensor comprising one or more of: an optical sensor, a camera, an RFID scanner, a short range radio frequency transceiver, etc. Generally, the receiving pad sensor may be configured to locate and/or identify a receiving pad 110 based on a receiving identifier. In some embodiments, the receiving pad sensor may further be configured collect identifying information of a receiving pad. For example, the receiving pad sensor may be configured to capture identifying information of the receiving pad from one or more of a visual identifier, an optically readable code, a radio frequency identification (RFID) tag, an optical beacon, and a radio frequency beacon. In some embodiments, the UAV 120 may include other flight sensors such as optical sensors and radars for detecting obstacles in the path of flight to avoid collisions. While only one UAV 120 is shown, in some embodiments, the central computer system 140 may communicate with and/or provide instructions to a plurality of UAVs simultaneously to perform deliveries to one or more locations.

The UAV 120 may transport the package 130 via a package release device such as an aerial crane 125. The aerial crane 125 may generally be a device configured to lower the package relative to the UAV 120. In some embodiments, the aerial crane 125 may be configured to release the package 130 onto a portion of the receiving pad 110 surround by the wall portion 115. In some embodiments, the aerial crane 125 may comprise an extendable cable coupled to the package 130. The aerial crane 125 may unwind the cable to lower the package 130 toward the receiving pad 110 while the UAV 120 maintains a hover altitude (e.g. 5-10 feet above the receiving pad). In some embodiments, the cable of the aerial crane 125 may comprise a coupling device configured to detachably couple to the package 130. For example, the coupling device may comprise one or more of a hook, a latch, a clamp, a clip, a magnet, etc. The cable of the aerial crane 125 may be configured to detach from the package when the package 130 come in close proximity of and/or contacts the receiving pad 110. The aerial crane 125 may then cause the cable to at least partially retract back into a housing of the aerial crane 125 before the UAV 120 returns to a dispatch facility. In some embodiments, the aerial crane 125 may be controlled by a control circuit of the UAV 120. In some embodiments, the aerial crane 125 may comprise a separate control circuit activated by the central computer system 140 and/or a wireless transmitter on the receiving pad 110. While one cable is shown in FIG. 1, in some embodiments, the aerial crane 125 may comprise two or more cables coupled to one or more packages during transport.

The package 130 may comprise any item ordered by a customer. In some embodiments, the package 130 may comprise one or more items in a container. The container may comprise a disposable and/or reusable container (e.g. cardboard, plastic, etc.). In some embodiments, the package 130 may comprise a coupling device configured to detachably couple to the cable of the aerial crane 125.

The receiving pad 110 may generally comprise a device configured to receive packages delivered by an aerial vehicle. In some embodiments, the receiving pad 110 comprises a base 112. In some embodiments, the base 112 may comprise one or more of a padded layer and a foam layer configured to reduce the force of impact experienced by a package dropped onto the base 112. In some embodiments, the base 112 may comprise a flexible and/or rollable material that may be rolled up and stored when the receiving pad 110 is not in use. In some embodiments, the base 112 of the receiving pad 110 comprises one or more folding creases for retracting the receiving pad when not in use. In some embodiments, the receiving pad 110 may be coupled to a motorized retractor configured to retract and extend the receiving pad 110. In some embodiments, the motorized retractor may be configured to automatically extend the receiving pad in response to an aerial vehicle approaching the receiving pad 110. In some embodiments, the approach of the UAV 120 may be detected based on detecting a signal broadcasted by the UAV 120 (e.g. a wireless beacon). In some embodiments, the motorized retractor may extend the receiving pad 110 based on an estimated delivery time provide by the central computer system 140. In some embodiments, the motorized retractor may be configured to automatically retract the receiving pad 110 when a user retrieves the delivered packages 130 from the receiving pad 110. In some embodiments, the motorized retractor may comprise a weight sensor for detecting the release of a package by UAV 120 and the removal of the package by a customer.

In some embodiments, the receiving pad 110 comprises one or more accessory couplers 117 attached to the receiving pad and configured to allow a receiving pad accessory to couple to and uncouple from the receiving pad 110. In some embodiments, the accessory coupler 117 may comprise one or more of a sliding slot, a hook and loop fastener, an aperture, a loop, etc. Generally, the accessory coupler 117 may comprise any conventional removable coupling means. In some embodiments, the receiving pad 110 may comprise two or more types of accessory couplers 117. The location of the accessory coupler 117 in FIG. 1 is shown as an example only. In some embodiments, accessory couplers may be located at one or more of the top, the bottom, an edge, a corner, etc. of the receiving pad 110 and/or may extend above, below, or outside of the base 112 of the receiving pad 110. In some embodiments, receiving pad accessories configured to couple to an accessory coupler 117 may comprise one or more of: a side wall, a receiving identifier, an anchor, and a wireless transceiver, an enclosure, a warning device, and a motorized retractor.

In some embodiments, the receiving pad 110 comprises a wall portion 115 surrounding at least a portion of the receiving pad 110. In some embodiments, the wall portion 115 may be removably coupled the base 112 of the receiving pad 110 via one or more accessory couplers 117. In some embodiments, the wall portion 115 comprises flexible netting configured to prevent packages from sliding out of the receiving pad 110. In some embodiments, the wall portion 115 may comprise cushioned and/or flexible material such as foam and/or fabric. In some embodiments, the wall portion 115 may comprise one or more poles for supporting the wall lining material. In some embodiments, the wall portions 115 may be configured to detach from the base 112 when the receiving pad 110 is not in use.

In some embodiments, the accessory coupler 117 may comprise a receiving identifier coupler. In some embodiment, the receiving identifier may comprise one or more of: a visual identifier, an optically readable code, a radio frequency identification (RFID) tag, an optical beacon, and a radio frequency beacon. Generally, the receiving identifier is configured to provide identifying information to a UAV 120 to assist in the locating of the delivery spot. In some embodiments, the customer may be prompted to associate the receiving identifier with their order and/or customer account prior to a delivery. For example, the user may be asked to scan an optically readable code and/or an RFID tag associated with the receiving pad 110 to associate with their profile and/or order. In some embodiments, the receiving identifier may correspond to one or more a receiving pad identifier, a customer account identifier, and a delivery order identifier. In some embodiments, the receiving identifier is configured to be updated for each aerial vehicle delivery drop. For example, when an order is submitted, the system may send a one-time use code to a user device and/or a receiving identifier configured for wireless communication. In some embodiments, a receiving identifier (e.g. beacon, transmitter, etc.) may be configured to broadcast and/or transmit the code to a UAV 120. In some embodiments, the user may be prompted to print out a receiving identifier (e.g. optically readable code or pattern) and attached the receiving identifier to the receiving pad 110 via an accessory coupler such as a paper receiving slot. The UAV 120 may then use the receiving identifier to determine whether the receiving pad 110 is associated with the delivery order of the package 130.

In some embodiments, the accessory coupler 117 may comprise an anchor coupler and the receiving pad accessory may comprise an anchor for securing the receiving pad to one or more of a ground and a fixture. For example, the anchor may comprise a stake configured to be inserted into the ground to secure the receiving pad 110. In another example, the anchor may comprise a suction cup configured to couple to a smooth surface such as glass or metal to secure the receiving pad 110. In some embodiments, the anchor may comprise a coupler for coupling the receiving pad 110 to a motorized retractor device configured to extendable and retract the receiving pad 110.

In some embodiment, the accessory coupler 117 may be configured to couple the receiving pad 110 to a wireless transceiver configured to communicate with one or more of the UAV 120 and a central computer system 140. In some embodiments, the wireless transceiver may be configured to provide an authorization signal to the UAV 120 to authorize the release of the package 130. In some embodiments, the authorization is provided based on one or more delivery conditions configured by the customer and/or the system. In some embodiments, the delivery condition may comprise one or more of user presence, package size, item price, item type, time of day, etc. prior to a delivery. For example, the user may select that medicine may only be delivered when the user is on the premises of the receiving pad 110. In another example, the user may select that items over $200 dollars should not be left in the receiving pad 110. In some embodiments, the wireless transceiver may be configured to detect the presence of the user based on detecting signals from a short range transceiver associated with the user (e.g. Bluetooth signal from a smartphone). In some embodiments, the central computer system 140 and/or a user device may determine whether the user on premises based on the GPS location of a mobile user device. In some embodiments, the delivery conditions may be loaded onto the wireless transceiver coupled to the receiving pad and the wireless transceiver may determine whether the conditions are met when a UAV 120 is detected. In some embodiments, the UAV 120 and/or the central computer system 140 may transmit details of the order (e.g. item price, package size, item type) to the wireless transceiver and/or a user device. In some embodiments, the receiving pad 110 may be coupled to a motorized retractor and the motorized retractor may only extend the receiving pad 110 if delivery conditions are met and the delivery is authorized. In some embodiments, the wireless transceiver may be configured to provide a digital authorization signature to the UAV 120 to accept the package. In some embodiments, the delivery may be authorized by a customer based on communications between one or more of the wireless transceiver, a user device, and the central computer system 140. For example, the central computer system 140 may determine whether conditions are met based on sensor data from the wireless transceiver and/or the user device. In some embodiments, the central computer system 140 may send a notification to the user device to obtain delivery authorization. In some embodiments, delivery conditions may specify whether a wireless device on the receiving pad may provide automatic authorization for the delivery or a user should be notified to provide the authorization. In some embodiments, the wireless transceiver may further perform the functions of a receiving identifier described herein.

The relative sizes and proportions of the receiving pad 110, the package 130, and the UAV 120 in FIG. 1 are illustrations only and are not necessarily to scale. In some embodiments, the receiving pad 110 and the package 130 may comprise any size and shape without departing from the spirit of the present disclosure.

Referring now to FIG. 2, a side view of a receiving pad is shown. In some embodiments, the receiving pad 200 may comprise the receiving pad 110 described with reference to FIG. 1 herein.

The receiving pad 200 comprises a base 210, vertical poles 220, netting 230, and a receiving identifier 215. The base 210 may comprise a foam and/or cushioned material. The vertical poles 220 may comprise rigid and/or semi-rigid material that extend vertically from the base 210. In some embodiments, the vertical poles 220 may be detachably coupled to the base via an accessory coupler such as a slot, a wedge, a hook and loop fastener, etc. The netting 230 comprises a flexible material that extends between the vertical poles 220 to form the walls around the base 210. In some embodiments, instead of the netting 230, walls may be formed by other types of material such as fabric, cardboard, foam, etc. When a package is dropped onto the base 210 between the netting 230, the base 210 reduces the force of impact from the drop and the netting 230 prevents the package from bouncing off and/or being blown off the receiving pad 200.

In FIG. 2, the receiving identifier 215 is shown to be coupled to the bottom of the base 210 of the receiving pad 200. In some embodiment, the receiving identifier 215 may comprise a radio frequency based identifier such as one or more of a radio frequency identification (RFID) tag, a radio frequency beacon, and a wireless transceiver. The signal from the receiving identifier 215 may remain detectable by a UAV at the bottom of the receiving pad 200. In some embodiments, an optically based receiving identifier such as a visual identifier, an optically readable code, and an optical beacon may be configured to be coupled to the top side of the receiving pad 200 such that the identifier is visible to one or more sensors on a UAV. In some embodiments, the receiving identifier 215 may be coupled to one or more of the base 210, a pole 220, and/or a wall portion such as the netting 230.

In some embodiments, the poles 220, the netting 230, and the receiving identifier 215, and other receiving pad accessories may be detachable from the base 210 by hand via an accessory coupler. For example, a user may switch out the receiving identifier 215 anytime by uncoupling the receiving identifier from an accessory coupler of the receiving pad 200. In another example, the user may be able to remove the poles 220 and/or the netting 230 by hand when the receiving pad 200 is not in use. In some embodiments, the base 210 may comprise a flexible, foldable, and/or rollable material such that a user may roll or fold the base 210 of the receiving pad 200 for storage. In some embodiments, the receiving pad 200 may further include a motorized retractor for rolling or folding the base 210 for storage.

Figure 3:
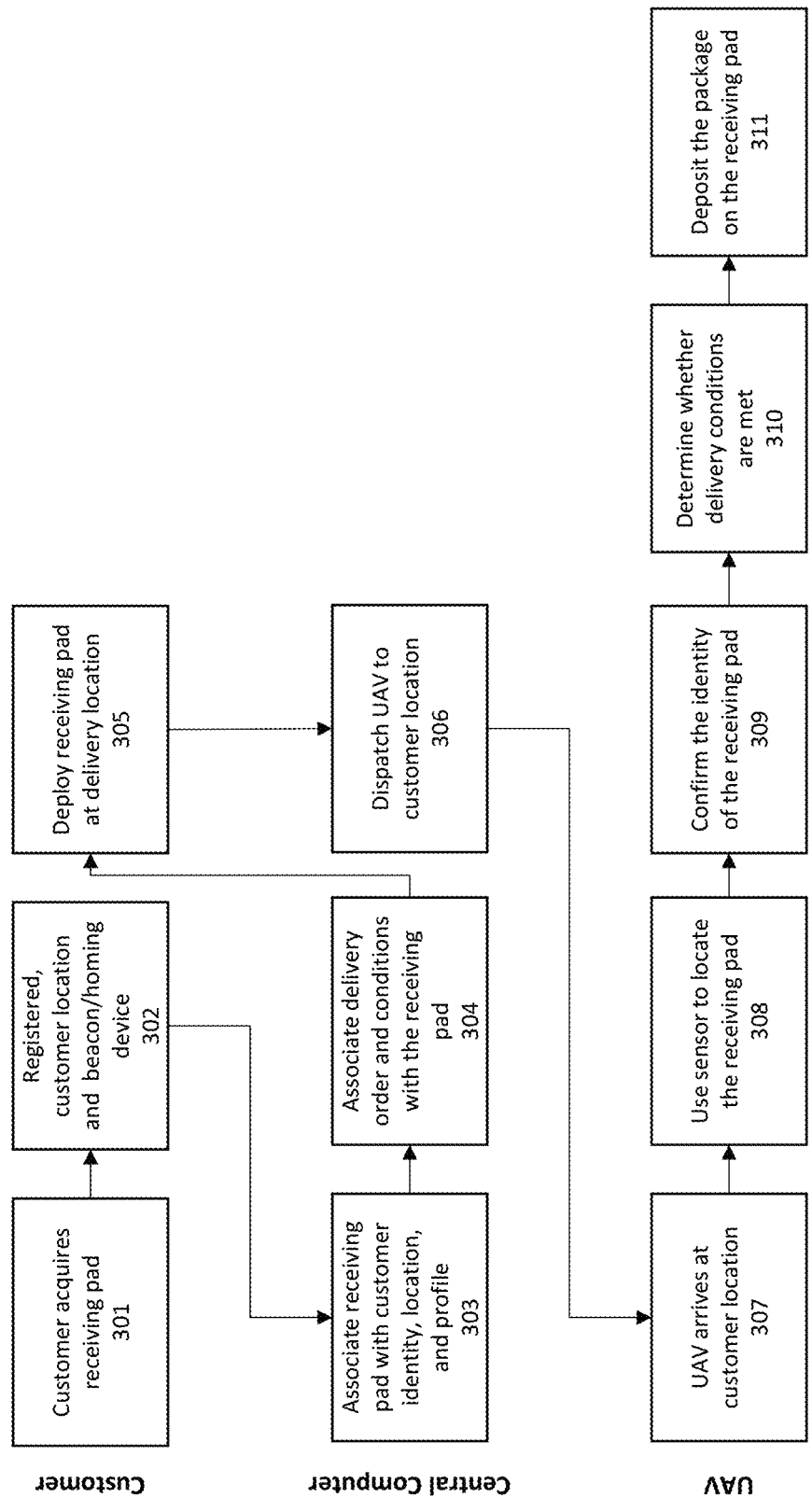
FIGS. 3, 4, 5, 6, and 7 are flow diagrams of processes in accordance with several embodiments.

Referring now to FIG. 3, a process according to some embodiments is shown. Generally, the method shown in FIG. 3 may be implemented with one or more processor-based devices such as devices having a control circuit, a central processor, a microprocessor, and the like. In some embodiments, the steps in FIG. 3 may be tracked and/or instructed by a central computer system comprising a processor and a memory such as the computer device described with reference to FIG. 8 herein. In some embodiments one or more steps shown in FIG. 3 may be performed by one or more of a user device, a central computer system, and a control circuit of a UAV.

In step 301, a customer acquires a delivery receiving pad. In some embodiments, a customer may order the receiving pad online or at a physical store. In step 302, the customer registers a customer location with the service. In some embodiments, the customer location may comprise a default delivery location such as a home address, an office address, etc. In some embodiments, the customer further registers a receiving identifier such a wireless beacon and/or homing device to the customer account. In some embodiments, the receiving identifier may be part of the receiving pad acquired in step 301. For example, the receiving identifier may comprise a removable accessory of the receiving pad and/or comprise a pattern on a receiving pad. In some embodiments, a user interface may be provided to the customer to enter the customer location and register the receiving identifier. For example, the receiving identifier may be registered by one or more of: entering a serial number on the receiving identifier, scanning an optical code or RFID tag on the receiving identifier, coupling a user device (e.g. smartphone, computer, etc.) with the receiving identifier via a wireless communication channel such as Wi-Fi, Bluetooth, and RFID communication or via a wired communication channel such as Universal Serial Bus (USB) connection, etc. In step 303, the central computer system associates the receiving identifier of the receiving pad with the customer profile of the customer. The customer profile may comprise information relating to the customer's identity and location.

In step 304, the central computer system receives a delivery order and associates the delivery order with the receiving pad associated with the customer account. In some embodiments, the central computer system further associates delivery conditions to the delivery. Delivery conditions may generally refer to the conditions be met before a package is released onto the receiving pad. For example, an aerial vehicle delivery may be authorized only if a receiving customer is on premises at the delivery location, and/the total value of the package is below a set amount. In some embodiments, the delivery conditions may be assigned by the central computer system based on one or more of the customer profile and item items ordered. In some embodiments, the delivery conditions may be configurable by a customer. In step 305, the customer deploys the receiving pad at the delivery location. In some embodiments, deploying the receiving pad comprises unfolding and/or unrolling the receiving pad and/or attaching one or more accessories to the receiving pad. For example, an accessory may comprise one or more of ground anchors, a receiving identifier, and side walls. In some embodiments, the customer may be instructed by the system to place the receiving pad at a location with sufficient horizontal and vertical clearance for a UAV to perform delivery. In step 306, the central computer system dispatches a UAV to the customer location to perform delivery. In some embodiments, step 306 comprises attaching a package to the UAV and loading destination and/or route information and delivery instructions onto the control circuit of the UAV. In some embodiments, destination information may comprise identifying information of the receiving identifier associated with the receiving pad registered in step 302.

In step 307, the UAV arrives at the customer location. In step 308, the UAV uses one or more sensors to locate the receiving pad. In some embodiments, the UAV may use one or more of an optical sensor, a camera, an RFID scanner, a wireless beacon sensor, etc. to locate the receiving pad. For example, the UAV may comprise a bottom-facing camera for capturing images of the area below the UAV. The UAV and/or the central computer system may perform image analysis to locate the receiving pad based on a pattern or an image on the receiving pad. In some embodiments, the UAV may locate the receiving pad based on detecting for the signal strength of a signal broadcasted by the receiving pad. In step 309, the UAV confirms the identity of the receiving pad. In some embodiments, the UAV may detect a receiving pad identifier using one or more sensors. The UAV and/or the central computer system may then compare the receiving pad identifier with the receiving identifier associated with the order to determine whether the correct receiving pad has been located. If the receiving identifiers do not match, the process may return to step 308 and the UAV may attempt to locate another receiving pad. In step 310, the UAV and/or the central computer system determines whether delivery conditions are met. The delivery conditions may correspond to the delivery conditions associated with the delivery order and/or the receiving pad in step 304. If delivery conditions are not met, a notification may be sent to the central computer system and/or a customer, and the UAV may be instructed to wait for a set period of time and/or return to the dispatch facility with the package. If delivery conditions are met, in step 311, the UAV deposits the package on the receiving pad. In some embodiments, the package may be released via a package release system that is configured to lower the package onto the receiving pad while the UAV maintains a hover above the receiving pad.

Figure 4:
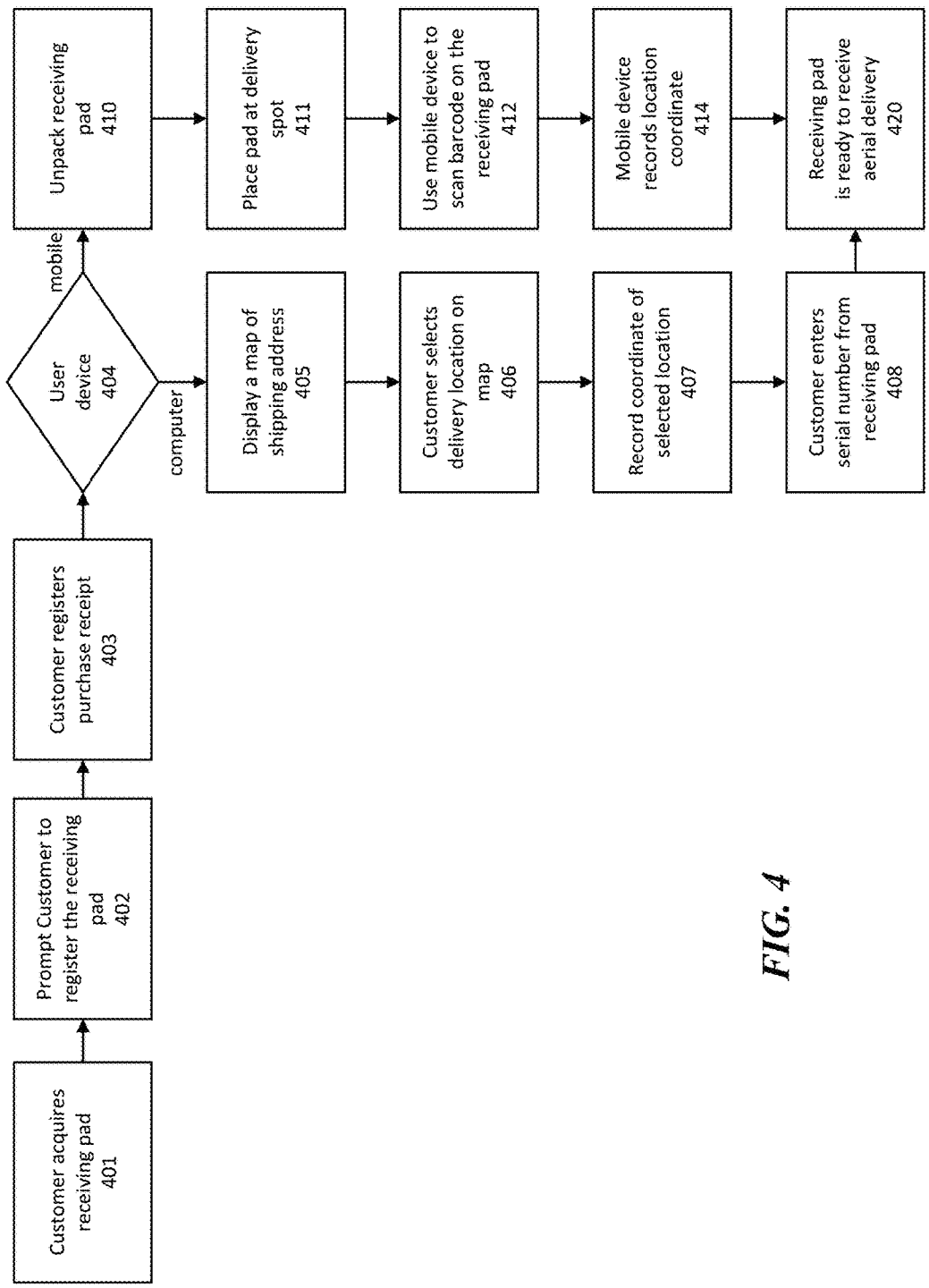

Referring now to FIG. 4, a process according to some embodiments is shown. Generally, the method shown in FIG. 4 may be implemented with one or more processor-based devices such as devices having a control circuit, a central processor, a microprocessor, and the like. In some embodiments, the steps in FIG. 4 may be tracked and/or instructed by a central computer system comprising a processor and a memory such as the computer device described with reference to FIG. 8 herein. In some embodiments, one or more steps shown in FIG. 4 may be performed by one or more of a user device, a central computer system, and a control circuit of a UAV. In some embodiments, one or more steps of FIG. 4 may comprise steps 302 and 303 of FIG. 3.

In step 401, a customer acquires a delivery receiving pad. In some embodiments, a customer may order the receiving pad online or at a physical store. In step 402, the system prompts the customer to register the receiving pad. The prompt may be provided via a user interface provided to the user to perform one or more of: order items for delivery, configure user profile, enter user location, etc. In step 403, the customer registers purchase receipt with the system. In some embodiments, the purchase receipt may be registered to associate the acquired receiving pad with the customer account. In some embodiments, if a user orders the receiving pad online via a user account, the receiving pad may be automatically associated with the customer account. In some embodiments, step 403 may be optional.

In step 404, the process may diverge based on whether the user accesses the system-provided user interface via a computer or via a mobile device comprising a GPS sensor. If the customer is using a computer and is accessing the user interface via a web browser and/or a computer program, in step 406, the user interface may show a map of a shipping address associated with the customer. In some embodiments, the map may be part of a mapping application. In step 407, the customer may select a delivery location on the map. In some embodiments, the provided map may comprise a satellite image and/or an outline of the delivery address, and the user may select a specific spot in the image to be the delivery spot. In step 407, the system records the coordination of the location selected in step 406. In step 408, the customer enters the serial number from the receiving pad. In some embodiments, the serial number may correspond to a receiving identifier that may be integrated with or removable from the receiving pad. In some embodiments, step 408 may be performed prior to step 405. In step 420, the receiving pad is ready to receive UAV delivery.

If the customer is accessing the system-provided user interface via a mobile device, such as via mobile site and/or a mobile application, in step 410, the customer may be prompted to first unpack the receiving pad. In step 411, the customer may be instructed to place the receiving pad at their chosen delivery spot. The customer may then use the mobile device to scan an optical code (e.g. barcode) on the receiving pad in step 412. For example, an image of the optical may be captured using a camera on the mobile device. In step 414, the mobile device records the coordinate at which the optical code is scanned. For example, a current GPS coordinate of the mobile device may be recorded when a mobile application and/or mobile site is used to scan the optical code. In step 420, the receiving pad is ready to receive UAV delivery.

Figure 5:
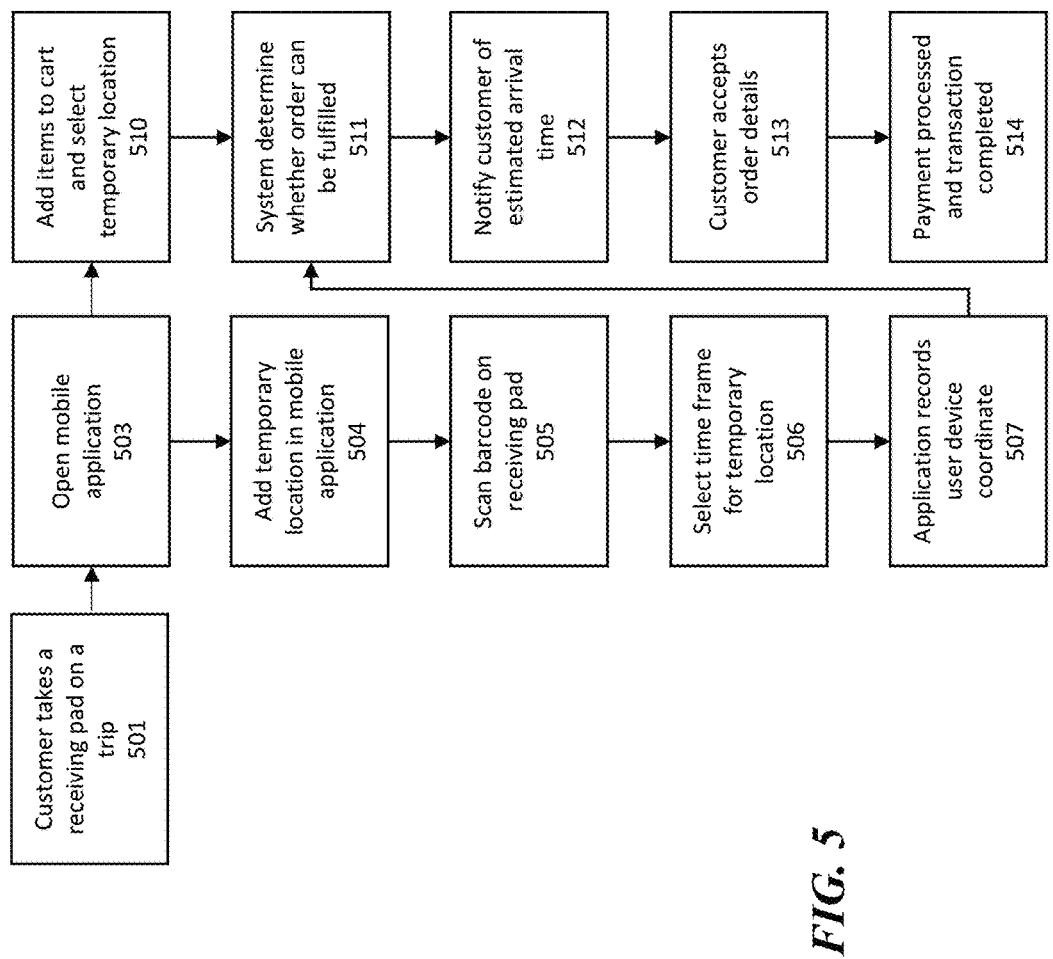

Referring now to FIG. 5, a process according to some embodiments is shown. Generally, the method shown in FIG. 5 may be implemented with one or more processor-based devices such as devices having a control circuit, a central processor, a microprocessor, and the like. In some embodiments, the steps in FIG. 5 may be tracked and/or instructed by a central computer system comprising a processor and a memory such as the computer device described with reference to FIG. 8 herein. In some embodiments one or more steps shown in FIG. 5 may be performed by one or more of a user device, a central computer system, and a control circuit of a UAV.

In step 501, a customer may take a receiving pad on a trip. The customer may travel away from a location associated with the customer account on a trip. In some embodiments, the receiving pad may comprise a receiving identifier that had been previously registered with the system. In some embodiments, the customer may only take the receiving identifier with them on a trip and couple to the receiving identifier to a different receiving pad to receive delivery orders. In step 503, the customer may wish to order items to be delivered by a UAV and opens a mobile application to place the order. In the mobile application, the user may first add items to a cart in step 510 and/or first enter a temporary location in step 504.

In step 504, the customer adds a temporary location to their customer profile via the mobile application. In some embodiments, the temporary location may be added by entering an address and/or providing a coordinate. In step 505, the customer scans an optical code on the receiving pad. In step 506, the customer may select a time frame for the temporary location. For example, the time frame may be associated with the duration that the customer will be at the temporary location. For example, a timeframe may be 2 days, 6 hours, etc. In some embodiment, the temporary location may correspond to a camp site, a hotel, a vacation home, an event venue, a picnic site, etc. In step 507, the mobile application records the user device coordinate to use as the delivery location. In some embodiments, the user interface may prompt the user to stand at a selected delivery spot in step 507 for the mobile application to capture the GPS coordinate of the delivery spot.

In step 510, the customer may select items from an online shopping user interface to add to a cart. The online shopping user interface may generally comprise any functions of a conventional online shopping user interface. The customer may then select the temporary location as the delivery destination of the delivery order. After items and destination location for the delivery order have been selected, the system may determine whether the order can be fulfilled in step 511. The determination may be based on one or more of: item availability in the area of the temporary location, whether the order may be delivery at the temporary location within the time frame specified in step 506, and/or whether the temporary location is within the service area of the aerial delivery service. If the order can be fulfilled, in step 512, the customer receives an estimated arrival time for the order. In step 513, the customer accepts the order details provided by the system. Order details may comprise information such as delivery cost, total cost, and estimate delivery time. In step 514, the system processes the payment and the transaction is completed. In some embodiments, the user may be prompted to enter payment information and/or authorize a charge to their previously entered payment method in step 514.

Figure 6:
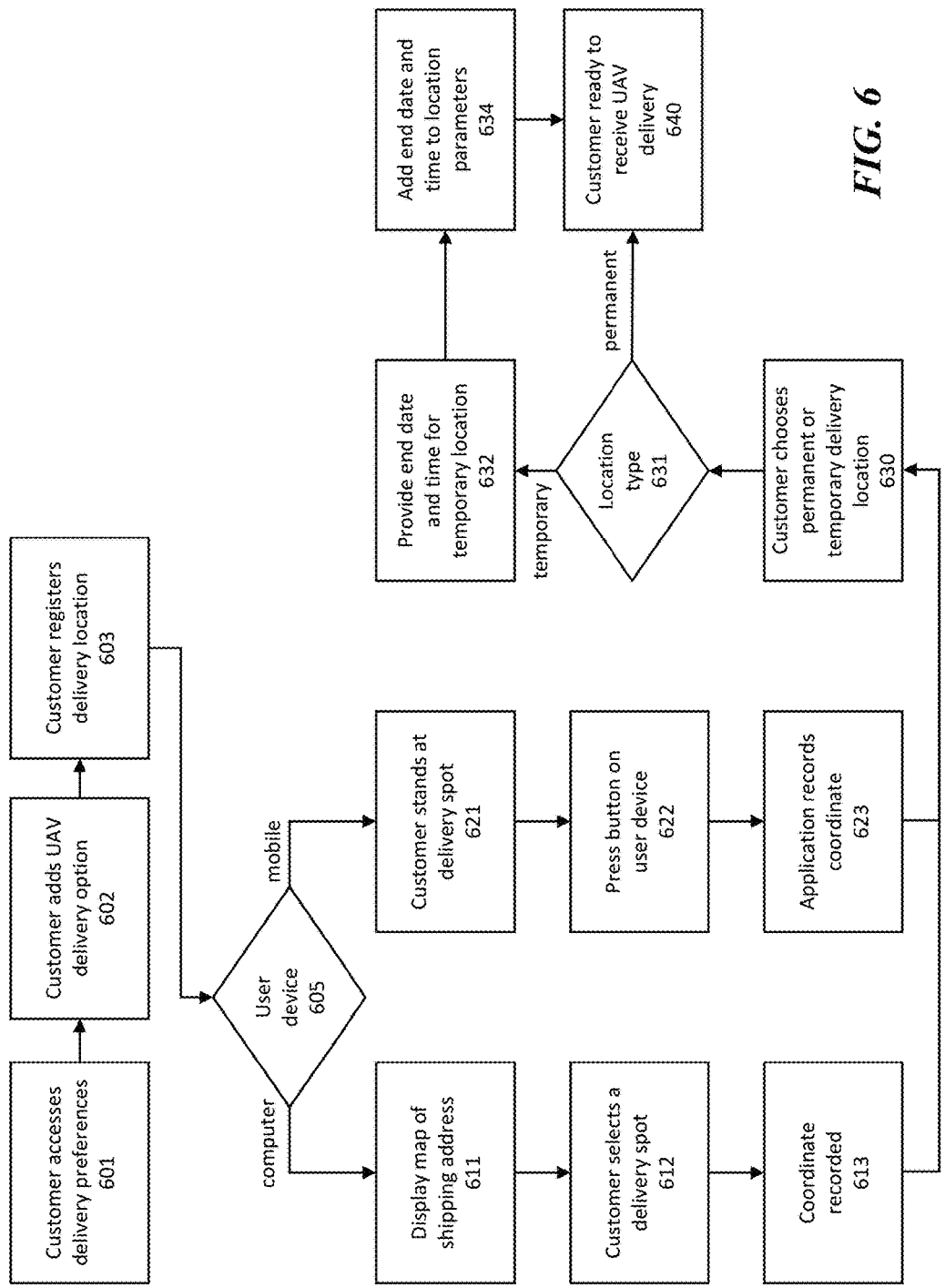

Referring now to FIG. 6, a process according to some embodiments is shown. Generally, the method shown in FIG. 6 may be implemented with one or more processor-based devices such as devices having a control circuit, a central processor, a microprocessor, and the like. In some embodiments, the steps in FIG. 6 may be tracked and/or instructed by a central computer system comprising a processor and a memory such as the computer device described with reference to FIG. 8 herein. In some embodiments, one or more steps shown in FIG. 6 may be performed by one or more of a user device, a central computer system, and a control circuit of a UAV. In some embodiments, one or more steps of FIG. 4 may comprise steps 302 and 303 of FIG. 3.

In step 601, a customer accesses delivery preferences associated with the customer profile via a user interface provided by a central computer system. The user interface may be accessed via a user device such as a smartphone, a computer, a wearable device, etc. In step 602, the customer adds UVA delivery option to their profile. In some embodiments, step 602 may correspond to the enrollment of the aerial delivery program and the acceptance of terms and conditions associated with the program. In step 603, the customer registers a delivery location for the customer profile. The delivery location may be entered as an address and/or a coordinate on a map.

In step 605, the process may diverge based on whether the user accesses the system-provided user interface via a computer or via a mobile device comprising a GPS sensor. If the customer is using a computer to access the user interface via a web browser and/or a computer program, in step 611, the user interface may show a map of a shipping address associated with the customer. In some embodiments, the map may be part of a mapping application. In step 612, the customer may select a delivery location on the map. In some embodiments, the provided map may comprise a satellite image or an outline of the delivery address, and the user may select a specific spot in the image to be the delivery spot. In step 613, the system records the coordination of the location selected in step 612.

If the customer is accessing the system-provided user interface via a mobile device, such as via mobile site and/or a mobile application, in step 621, the customer may be prompted to stand at the chosen delivery spot at the delivery location. In step 622, the user is prompted to press a button on the user interface at the delivery spot. In some embodiments, the button may comprise an on-screen button in the user interface. In step 623, the application records the GPS coordinate of the mobile device when the button is pressed in step 622. The coordinate may then be used as the delivery spot coordinate.

In step 630, the customer may designate the location configured in steps 603-623 as either a permanent or a temporary delivery location. In step 631, if the location type is a permanent location, the process may proceed to step 640 and the customer may be ready to place and receive UAV delivery orders. If the location types is a temporary location, in step 632, the customer may be prompted to provide and end date and/or time for the temporary location. For example, the temporary location may correspond to a vacation home, and the customer may enter the time that the customer plans to leave the vacation home in step 632. In step 634, the system adds the end date and/or time to the location parameters stored in the customer profile. The process may then proceed to step 640 and the customer may be ready to place and receive UAV delivery orders.

Figure 7:
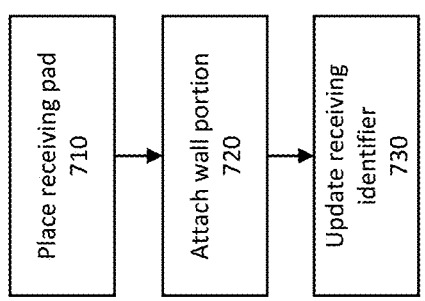

Referring now to FIG. 7, a process according to some embodiments is shown. Generally, the method shown in FIG. 7 may be implemented with one or more processor-based devices such as devices having a control circuit, a central processor, a microprocessor, and the like. In some embodiments, the steps in FIG. 7 may be tracked and/or instructed by a central computer system comprising a processor and a memory such as the computer device described with reference to FIG. 8 herein. In some embodiments one or more steps shown in FIG. 7 may be performed by one or more of a user device, a central computer system, and a control circuit of a UAV.

In step 710, the customer places the receiving pad to receive a package delivered by an aerial vehicle. In some embodiments, the receiving pad comprises one or more accessory couplers configured to allow a receiving pad accessory to couple to and uncouple from the receiving pad. In some embodiments, placing the receiving pad comprises unfolding and/or unrolling the receiving pad and/or attaching one or more accessories to the receiving pad. In some embodiments, the customer may be instructed to place the receiving pad at a location with sufficient horizontal and vertical clearance for a UAV to perform delivery via a user interface.

In step 720, the customer removably attaches a wall portion to the receiving pad via an accessory coupler to surround at least a portion of the receiving pad. In some embodiments, the wall portion comprises flexible netting configured to prevent packages from sliding out of the receiving pad. In some embodiments, the wall portion may comprise cushioned and/or flexible material such as foam and/or fabric. In some embodiments, the wall portion may comprise one or more poles for supporting the wall lining material. In some embodiments, the wall portions may be configured to detach from the base by hand when the receiving pad is not in use. In some embodiments, the customer may further attach other accessories such as an anchor, a receiving identifier, and a wireless transceiver to the receiving pad via one or more accessory couplers.

In step 730, the receiving identifier attached the receiving pad is updated prior to a delivery from an aerial vehicle. In some embodiments, the receiving identifier may be coupled to the receiving pad via an accessory coupler. In some embodiments, the receiving identifier is configured to be updated for each aerial vehicle delivery drop. For example, when an order is submitted, the system may send a one-time use code to a user device and/or the receiving identifier. In some embodiments, a receiving identifier (e.g. beacon, transmitter, etc.) may be configured to communicate broadcast and/or transmit the code to the UAV to perform delivery. In some embodiments, the user may be prompted to print out a receiving identifier (e.g. optically readable code or pattern) and attached the receiving identifier to the receiving pad via an accessory coupler. For example, a printout may be inserted into a paper slot on the upward facing surface of the receiving pad to serve as the receiving identifier. A UAV may then use the receiving identifier to determine whether the receiving pad is associated with the delivery order assigned to the UAV. In some embodiments, step 730 may be optional, and the receiving identifier of the receiving pad may remain static over multiple deliveries.

After step 730, a UAV may be instructed to travel to the customer. The UAV may locate the receiving pad based on wirelessly and/or optically locating the receiving identifier. In some embodiments, the UAV and/or the central computer may further determine whether delivery conditions are met. The UAV may then release the package into the receiving pad.

Figure 8:
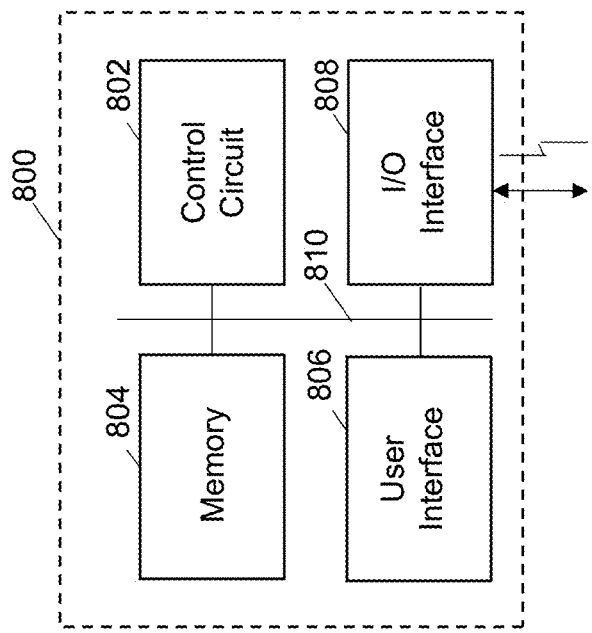
FIG. 8 comprises a block diagram of a computer device in accordance with several embodiments.

FIG. 8 illustrates a functional block diagram that may generally represent any number of various electronic components of the system for providing the portable container delivery service that is a computer type device. The computer device 800 includes a control circuit 802, a memory 804, a user interface 806 and an input/output (I/O) interface 808 providing any type of wired and/or wireless connectivity to the computer device 800, all coupled to a communication bus 810 to allow data and signaling to pass therebetween. Generally, the control circuit 802 and the memory 804 may be referred to as a control unit. The control circuit 802, the memory 804, the user interface 806 and the I/O interface 808 may be any of the devices described herein or as understood in the art. The functionality of the computer device 800 will depend on the programming stored in the memory 804. The computer device 800 may represent a high level diagram for one or more of a central computer system, a user device for accessing a user interface provided by the central computer system, a control circuit of a UAV, a control circuit of a package release system carried by a UAV, and a wireless transceiver coupled to a receiving pad described herein.

In one embodiment, an apparatus for receiving aerial vehicle delivery comprises a receiving pad configured to receive a package released by an aerial vehicle; one or more accessory couplers attached to the receiving pad and configured to allow a receiving pad accessory to couple to and uncouple from the receiving pad; and a wall portion surrounding at least a portion of the receiving pad, the wall portion being removably coupled to the receiving pad via an accessory coupler.

In one embodiment, a method for receiving aerial vehicle delivery, comprises placing a receiving pad to receive a package delivered by an aerial vehicle, the receiving pad comprises one or more accessory couplers configured to allow a receiving pad accessory to couple to and uncouple from the receiving pad; and removably attaching a wall portion to the receiving pad via an accessory coupler to surround at least a portion of the receiving pad.

In one embodiment, a system for receiving aerial vehicle delivery comprises: a package receiving apparatus comprising: a receiving pad; one or more accessory couplers attached to the receiving pad and configured to allow a receiving pad accessory to couple to and uncouple from the receiving pad; and a wall portion surrounding at least a portion of the receiving pad, the wall portion being removably coupled to the receiving pad via an accessory coupler; and an aerial vehicle configured to deliver a package while in flight comprising: a receiving pad sensor configured to identify a delivery spot based on a receiving identifier; and a package release device configured to release the package onto a portion of the receiving pad surround by the wall portion.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for receiving aerial vehicle delivery comprising:
   a receiving pad configured to receive a package released by an aerial vehicle hovering over the receiving pad;
   one or more accessory couplers attached to the receiving pad and configured to allow a receiving pad accessory to couple to and uncouple from the receiving pad; and
   a wall portion surrounding at least a portion of the receiving pad, the wall portion being removably coupled to the receiving pad via an accessory coupler; and
   wherein the receiving pad is coupled to a motorized retractor configured to retract and extend the receiving pad; and
   wherein the motorized retractor is configured to automatically extend the receiving pad in response to the aerial vehicle approaching the receiving pad.

2. The apparatus of claim 1, wherein the wall portion comprises flexible netting configured to prevent packages from sliding out of the receiving pad.

3. The apparatus of claim 1, wherein the receiving pad comprises one or more of a padded layer and a foam layer.

4. The apparatus of claim 1, wherein the receiving pad accessory comprises a receiving identifier.

5. The apparatus of claim 4, wherein the receiving identifier comprises one or more of a visual identifier, an optically readable code, a radio frequency identification (RFID) tag, an optical beacon, and a radio frequency beacon.

6. The apparatus of claim 4, wherein the one or more accessory couplers comprise a receiving identifier coupler.

7. The apparatus of claim 4, wherein the receiving identifier is configured to be updated for each aerial vehicle delivery drop.

8. The apparatus of claim 4, wherein the receiving identifier corresponds to one or more of a receiving pad identifier, a customer account identifier, and a delivery order identifier.

9. The apparatus of claim 1, wherein the receiving pad accessory comprises an anchor for securing the receiving pad to one or more of a ground and a fixture.

10. The apparatus of claim 1, wherein the receiving pad accessory comprises a wireless transceiver configured to communicate with one or more of the aerial vehicle and a central computer system.

11. The apparatus of claim 10, wherein the wireless transceiver is configured to provide an authorization signal to the aerial vehicle to authorize a release of the package.

12. The apparatus of claim 11, wherein the authorization signal is provided based on one or more of a user proximity to the receiving pad and a user configured setting.

13. The apparatus of claim 1, wherein the receiving pad comprises one or more folding creases for retracting the receiving pad.

14. The apparatus of claim 1, wherein the receiving pad comprises a rollable material configured to be rolled up when not in use.

15. A method for receiving aerial vehicle delivery, comprising:
   placing a receiving pad to receive a package delivered by an aerial vehicle hovering over the receiving pad, the receiving pad comprises one or more accessory couplers configured to allow a receiving pad accessory to couple to and uncouple from the receiving pad; and
   removably attaching a wall portion to the receiving pad via an accessory coupler to surround at least a portion of the receiving pad; and
   coupling the receiving pad to a motorized retractor configured to retract and extend the receiving pad; wherein the motorized retractor is configured to automatically extend the receiving pad in response to the aerial vehicle approaching the receiving pad.

16. The method of claim 15, further comprising:
   updating a receiving identifier attached the receiving pad via one of the one or more accessory couplers prior to a delivery from the aerial vehicle.

17. A system for receiving aerial vehicle delivery comprising:
   a package receiving apparatus comprising:
      a receiving pad;
      one or more accessory couplers attached to the receiving pad and configured to allow a receiving pad accessory to couple to and uncouple from the receiving pad;
      a motorized retractor configured to retract and extend the receiving pad; and
      a wall portion surrounding at least a portion of the receiving pad, the wall portion being removably coupled to the receiving pad via an accessory coupler; and
   an aerial vehicle configured to deliver a package while in flight comprising:
      a receiving pad sensor configured to identify a delivery spot based on a receiving identifier; and
      a package release device configured to release the package onto the portion of the receiving pad surround by the wall portion while hovering over the receiving pad;
   wherein the motorized retractor is configured to automatically extend the receiving pad in response to the aerial vehicle approaching the receiving pad.

18. The system of claim 17, wherein the package release device comprises a crane configured to lower the package into the portion of the receiving pad surround by the wall portion.

* * * * *